(12) United States Patent
Zou et al.

(10) Patent No.: US 8,741,795 B2
(45) Date of Patent: *Jun. 3, 2014

(54) OPTICAL GLASS

(71) Applicants: Xuelu Zou, Tokyo (JP); Yunoshin Kanayama, Tokyo (JP); Tomoaki Negishi, Tokyo (JP)

(72) Inventors: Xuelu Zou, Tokyo (JP); Yunoshin Kanayama, Tokyo (JP); Tomoaki Negishi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/845,229

(22) Filed: Mar. 18, 2013

(65) Prior Publication Data

US 2013/0210604 A1 Aug. 15, 2013

Related U.S. Application Data

(62) Division of application No. 12/865,574, filed as application No. PCT/JP2009/051402 on Jan. 22, 2009, now Pat. No. 8,424,344.

(30) Foreign Application Priority Data

Jan. 30, 2008 (JP) ................................ 2008-019422

(51) Int. Cl.
 C03C 3/066 (2006.01)
 C03C 3/068 (2006.01)
 C03C 3/15 (2006.01)

(52) U.S. Cl.
 USPC .................. 501/79; 501/78; 501/50; 501/51; 501/52

(58) Field of Classification Search
 USPC ................................ 501/50, 51, 78, 79, 52
 See application file for complete search history.

(56) References Cited

U.S. PATENT DOCUMENTS

| | | | |
|---|---|---|---|
| 6,595,026 B1 | 7/2003 | Tsukada | |
| 6,912,093 B2 | 6/2005 | Endo | |
| 7,560,405 B2 * | 7/2009 | Hayashi et al. | 501/79 |
| 8,110,514 B2 * | 2/2012 | Negishi et al. | 501/51 |
| 8,127,570 B2 * | 3/2012 | Negishi et al. | 65/61 |
| 8,410,008 B2 * | 4/2013 | Negishi et al. | 501/51 |
| 8,424,344 B2 * | 4/2013 | Zou et al. | 65/61 |
| 8,476,178 B2 * | 7/2013 | Zou et al. | 501/73 |
| 8,492,299 B2 * | 7/2013 | Negishi et al. | 501/79 |
| 2003/0211929 A1 | 11/2003 | Hayashi et al. | |
| 2005/0197243 A1 | 9/2005 | Hayashi | |
| 2005/0209085 A1 * | 9/2005 | Endo | 501/50 |
| 2006/0189473 A1 * | 8/2006 | Endo | 501/78 |
| 2006/0234850 A1 * | 10/2006 | Hayashi et al. | 501/78 |
| 2008/0248941 A1 * | 10/2008 | Fu | 501/50 |
| 2008/0287280 A1 | 11/2008 | Onoda et al. | |
| 2008/0293556 A1 | 11/2008 | Fujiwara | |
| 2009/0176641 A1 | 7/2009 | Kobayashi et al. | |
| 2009/0325779 A1 | 12/2009 | Negishi et al. | |
| 2010/0018252 A1 | 1/2010 | Zou et al. | |
| 2010/0081555 A1 | 4/2010 | Negishi et al. | |
| 2011/0257002 A1 * | 10/2011 | Negishi | 501/78 |
| 2013/0178354 A1 * | 7/2013 | Negishi et al. | 501/42 |

FOREIGN PATENT DOCUMENTS

| | | |
|---|---|---|
| CN | 1663923 A | 9/2005 |
| JP | 54-90218 | 7/1979 |
| JP | 2005-179142 A | 7/2005 |
| JP | 2005179142 A * | 7/2005 |
| JP | 2005-247613 | 9/2005 |
| JP | 2005-331521 | 12/2005 |
| JP | 2006-248897 A | 9/2006 |
| JP | 2007-119335 | 5/2007 |
| JP | 2007-269584 | 10/2007 |
| JP | 2007-269613 A | 10/2007 |
| JP | 2007269584 A * | 10/2007 |
| JP | 2009-179510 | 8/2009 |
| JP | 5138401 | 11/2012 |
| WO | WO 2007/148816 A1 | 12/2007 |

OTHER PUBLICATIONS

Official Action and English translation in CN Application No. 200980103652.5 (SN 2013032601000610) dated Mar. 29, 2013.
Notice of Allowance in JP 2013-113938 dated Jun. 18, 2013.
Official Action and English translation of Third Office Action in CN 200980103652.5 dated Dec. 14, 2012.
Official Action and English Excerption of Official Action (Final) in JP 2012-189398 dated Dec. 18, 2012.
Chinese First Official Action and English translation in CN200980103652.5 dated Feb. 13, 2012.
Chinese Second Official Action and English translation in CN200980103652.5 dated Sep. 13, 2012.
Japanese Official Action and English translation in JP2012-189398 dated Sep. 25, 2012.
International Search Report for PCT/JP2009/051402, mailed Apr. 28, 2009.
Written Opinion of the International Searching Authority for PCT/JP2009/051402 mailed Apr. 28, 2009.
Derwent Abstract 2007-836461 of JP 2007-269584 A, Oct. 18, 2007.
Decision of Rejection and English translation in JP 2012-189398 mailed Mar. 5, 2013.
Korean Action and partial English translation in KR 10-2010-7017010 dated Oct. 24, 2013.
Chinese Decision of Rejection (with English language translation) in CN application No. 200980103652.5 dated Aug. 6, 2013.

* cited by examiner

*Primary Examiner* — Kaj K Olsen
*Assistant Examiner* — Elizabeth A Bolden
(74) *Attorney, Agent, or Firm* — Nixon & Vanderhye P.C.

(57) ABSTRACT

An optical glass having high-refractivity and low-dispersion properties and containing, by mol %, 0.1 to 40% of $SiO_2$, 10 to 50% of $B_2O_3$, wherein the mass ratio of the content of $SiO_2$ to the content of $B_2O_3$, $SiO_2/B_2O_3$, is 1 or less, 0.5 to 22% of ZnO, 5 to 50% of $La_2O_3$, and optionally other ingredients. The optical glass has a refractive index nd of 1.86 to 1.95 and an Abbe's number vd of (2.36–nd)/0.014 or more but less than 38, and a glass transition temperature of equal to or greater than 640° C.

21 Claims, 1 Drawing Sheet

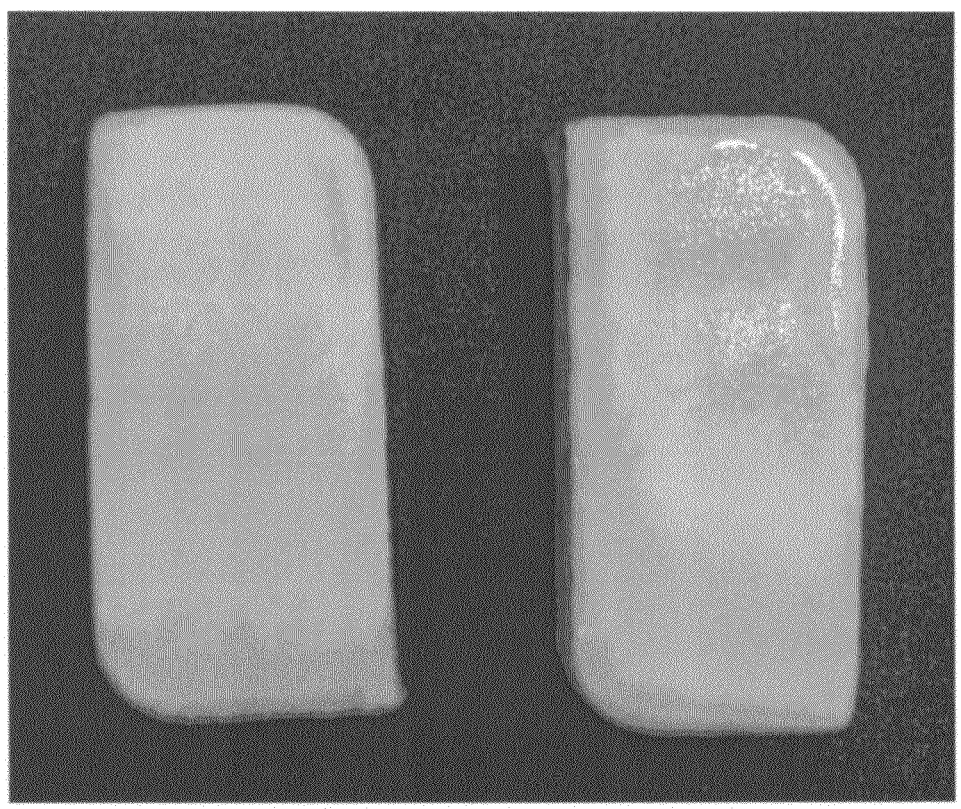

OPTICAL GLASS

This application is a divisional of application Ser. No. 12/865,574 filed Sep. 8, 2010, now allowed, which in turn is the U.S. national phase of International Application No. PCT/JP2009/051402, filed 22 Jan. 2009, which designated the U.S. and claims priority to Japanese Application No. 2008-019422, filed 30 Jan. 2008, the entire contents of each of which are hereby incorporated by reference.

TECHNICAL FIELD

This invention relates to an optical glass in a broad sense, and specifically, it relates to an optical glass having high-refractivity low-dispersion properties, to a press-molding glass gob, an optical element formed of the above optical glass and its production process and to a process for the production of an optical element blank.

BACKGROUND ART

A lens formed of a high-refractivity low-dispersion glass enables the downsizing of an optical system while correcting a chromatic aberration when combined with a lens formed of a high-refractivity high-dispersion glass. It hence occupies an important place as an optical element for constituting an image-sensing system or a projection optical system such as a projector.

JP 2007-269584A discloses such a high-refractivity low-dispersion glass. The glass disclosed in JP 2007-269584A has a refractive index nd of 1.75 to 2.00 and has a $Ta_2O_5$ content in the range of 0 to 25 mass %, and all of the glasses that have a refractive index nd of at least 1.85 contain a large amount of $Ta_2O_5$. That is because the introduction of a large amount of $Ta_2O_5$ is indispensable for securing glass stability in the region of high refractivity such as a refractive index nd of 1.75 or more. For such a high-refractivity low-dispersion glass, $Ta_2O_5$ is a main and essential component.

Meanwhile, tantalum (Ta) is an element having a high rarity value and is in itself a very expensive substance. Moreover, rare metal prices are recently soaring worldwide, and the supply of tantalum is deficient. In the field of glass production, tantalum as a raw material is deficient, and if such a situation continues, it may be no longer possible to maintain the stable supply of high-refractivity low-dispersion glasses that are essential and indispensable in the industry of optical apparatuses.

SUMMARY OF THE INVENTION

Problems to be Solved by the Invention

Under the circumstances, it is an object of this invention to provide a high-refractivity low-dispersion optical glass that can be stably supplied and has excellent glass stability, a press-molding glass gob and an optical element that are formed of the above glass, and processes for the production of an optical element blank and an optical element.

Means to Solve the Problems

For achieving the above object, the present inventors have made diligent studies and as a result have found that the above object can be achieved by an optical glass having a specific glass composition, a specific refractive index and a specific Abbe's number. This invention has been accordingly completed on the basis of the above finding.

That is, this invention provides (1) an optical glass comprising, by mol %,
0.1 to 40% of $SiO_2$,
10 to 50% of $B_2O_3$,
0 to 10% of total of $Li_2O$, $Na_2O$ and $K_2O$,
0 to 10% of total of MgO, CaO, SrO and BaO,
0.5 to 22% of ZnO,
5 to 50% of $La_2O_3$,
0.1 to 25% of $Gd_2O_3$,
0.1 to 20% of $Y_2O_3$,
0 to 20% of $Yb_2O_3$,
0 to 25% of $ZrO_2$,
0 to 25% of $TiO_2$,
0 to 20% of $Nb_2O_5$,
0 to 10% of $Ta_2O_5$,
over 0.1% but not more than 20% of $WO_3$,
0 to less than 3% of $GeO_2$,
0 to 10% of $Bi_2O_3$, and
0 to 10% of $Al_2O_3$,
the mass ratio of the content of $SiO_2$ to the content of $B_2O_3$, $SiO_2/B_2O_3$, being 1 or less,
the optical glass having a refractive index nd of 1.86 to 1.95 and an Abbe's number vd of (2.36−nd)/0.014 or more but less than 38, (2) an optical glass as recited in the above (1), wherein the content of $Ta_2O_5$ is 0 to 7 mol %, (3) an optical glass as recited in the above (1) or (2), which is a Ge-free glass, (4) a press-molding glass gob formed of the optical glass recited in any one of the above (1) to (3), (5) an optical element formed of the optical glass formed of the optical glass recited in any one of the above (1) to (4), (6) a process for the production of an optical element blank that is completed into an optical element by grinding and polishing,
the process comprising softening the press-molding glass gob recited in the above (4) under heat and press-molding it, (7) a process for the production of an optical element blank that is completed into an optical element by grinding and polishing,
the process comprising melting glass raw materials and press-molding the resultant molten glass to produce the optical element blank formed of the optical glass recited in any one of the above (1) to (3), and (8) a process for the production of an optical element, which comprises cutting and polishing the optical element blank recited in the above (6) or (7).

Effect of the Invention

According to this invention, there can be provided a high-refractivity low-dispersion optical glass that can be stably supplied and has excellent glass stability, a press-molding glass gob and an optical element that are formed of the above optical glass, and processes for the production of an optical element blank and an optical element.

BRIEF EXPLANATION OF DRAWINGS

FIG. 1 is a photograph of devitrified glasses obtained in Comparative Examples 1 and 2.

WORKING EMBODIMENTS OF THE INVENTION

[Optical Glass]

First, the optical glass of this invention will be explained.

In the optical glass of this invention, the introduction of $Ta_2O_5$ that is particularly expensive among glass components is decreased or limited. Under this limitation, even when attempts are made to impart a glass with high-refractivity low-dispersion properties with maintaining devitrification resistance, glass raw materials cannot form any glass or a formed glass is devitrified during a production process and is no longer useable when the amount of $Ta_2O_5$ is simply decreased. For decreasing the introduction amount of $Ta_2O_5$ while avoiding these problems, the apportionment of components for imparting a high refractive index is important.

In this invention, not only $B_2O_3$ and $SiO_2$ are introduced as components for forming a glass network, but also $La_2O_3$, $Gd_2O_3$, $Y_2O_3$, $WO_3$ and ZnO that are components for imparting a high refractive index are made to be co-present. In this invention, ZnO is an essential component not only for improving meltability and decreasing a glass transition temperature but also for serving to attain high-refractivity low-dispersion and improve devitrification resistance.

Under these conditions, the content of $B_2O_3$ and the content of $SiO_2$ are well balanced to improve devitrification resistance, meltability and formability of a molten glass, and also well balanced with other components, whereby the above object of this invention can be achieved.

The optical glass of this invention comprises, by mol %,
0.1 to 40% of $SiO_2$,
10 to 50% of $B_2O_3$,
0 to 10% of total of $Li_2O$, $Na_2O$ and $K_2O$,
0 to 10% of total of MgO, CaO, SrO and BaO,
0.5 to 22% of ZnO,
5 to 50% of $La_2O_3$,
0.1 to 25% of $Gd_2O_3$,
0.1 to 20% of $Y_2O_3$,
0 to 20% of $Yb_2O_3$,
0 to 25% of $ZrO_2$,
0 to 25% of $TiO_2$,
0 to 20% of $Nb_2O_5$,
0 to 10% of $Ta_2O_5$,
over 0.1% but not more than 20% of $WO_3$,
0 to less than 3% of $GeO_2$,
0 to 10% of $Bi_2O_3$, and
0 to 10% of $Al_2O_3$,
the mass ratio of the content of $SiO_2$ to the content of $B_2O_3$, $SiO_2/B_2O_3$, being 1 or less,
the optical glass having a refractive index nd of 1.86 to 1.95 and an Abbe's number vd of (2.36−nd)/0.014 or more but less than 38.

(Reason for Limitation to Compositional Range)

Reasons for limitations to the above compositional ranges will be explained below, while contents or total contents by % hereinafter stand for contents or total contents by mol % unless otherwise specified.

$SiO_2$ is a network-forming oxide and is an essential component necessary for maintaining glass stability and maintaining a viscosity suitable for forming a molten glass. When the content thereof is less than 0.1%, the glass stability decreases, and the viscosity of the glass during the formation of a molten glass decreases, so that the formability of a glass is degraded. Further, the glass is degraded in chemical durability. When the above content exceeds 40%, it is difficult to realize the desired refractive index, and further, the liquidus temperature and the glass transition temperature are increased. Further, there are caused problems that it is difficult to realize the desired Abbe's number, that the meltability of the glass is degraded and the devitrification resistance is degraded. The content of $SiO_2$ is therefore adjusted to 0.1 to 40%. The content of $SiO_2$ is preferably in the range of 3 to 35%, more preferably in the range of 5 to 30%, still more preferably in the range of 5 to 25%, yet more preferably in the range of 7 to 22%, further more preferably in the range of 10 to 20%.

$B_2O_3$ is a network-forming component and is an essential component effective for maintaining the meltability of the glass and decreasing the liquidus temperature. Further, it is also an effective component for imparting a low-dispersion property. When the content thereof is less than 10%, the glass stability decreases. When it exceeds 50%, not only it is difficult to satisfy the desired refractive index, but also the chemical durability is degraded. The content of $B_2O_3$ is therefore adjusted to 10 to 50%. The content of $B_2O_3$ is preferably in the range of 12 to 45%, more preferably in the range of 15 to 43%, still more preferably in the range of 17 to 40%, yet more preferably in the range of 17 to 38%, further more preferably in the range of 18 to 35%.

For decreasing the liquidus temperature and improving the devitrification resistance and the meltability, and for maintaining viscosity suitable for glass formability, the mass ratio of the content of $SiO_2$ to the content of $B_2O_3$, $SiO_2/B_2O_3$, is adjusted to 1 or less. The above mass ratio refers to a value obtained by dividing the content of $SiO_2$ by mass % with the content of $B_2O_3$ by mass %. When the above ratio exceeds 1, not only the liquidus temperature increases, but also the devitrification resistance is degraded. And, the meltability is also degraded, and it is also difficult to realize the desired Abbe's number.

The above mass ratio is preferably in the range of 0.95 or less, more preferably in the range of 0.90 or less.

$Li_2O$, $Na_2O$ and $K_2O$ are optional components that work to improve the meltability and decrease the glass transition temperature. When the total content of $Li_2O$, $Na_2O$ and $K_2O$ exceeds 10%, it is difficult to realize the desired refractive index, and the chemical durability is also decreased. The total content of $Li_2O$, $Na_2O$ and $K_2O$ is therefore adjusted to 0 to 10%. The total content of $Li_2O$, $Na_2O$ and $K_2O$ is preferably in the range of 0 to 8%, more preferably in the range of 0 to 6%, still more preferably 0 to 4%, yet more preferably in the range of 0 to 2%, and it is further more preferred to incorporate none of the above alkali metal oxides.

MgO, CaO, SrO and BaO work to improve the meltability of the glass and improve the glass in light transmittance in a visible light region. When introduced in the form of carbonates or nitrates, they also produce an anti-foaming effect. However, when the total content of these exceeds 10%, the liquidus temperature increases and the devitrification resistance is degraded. Besides these, the refractive index is decreased, and the chemical durability is degraded. Therefore, the total content of MgO, CaO, SrO and BaO is adjusted to 0 to 10%. The total content of MgO, CaO, SrO and BaO is preferably in the range of 0 to 8%, more preferably in the range of 0 to 6%, still more preferably in the range of 0 to 4%, yet more preferably in the range of 0 to 2%. It is further more preferred to incorporate none of these alkaline earth metal oxides.

ZnO is an essential component useful for realizing the high-refractivity low-dispersion properties, and it works to improve the glass in meltability and devitrification resistance and decrease the liquidus temperature and the glass transition temperature. When the content thereof is less than 0.5%, the refractive index may decrease, the liquidus temperature may increase or the devitrification resistance may be degraded. On the other hand, when the above content exceeds 22%, it is difficult to realize the desired refractive index. Therefore, the content of ZnO is adjusted to 0.5 to 22%. The content of ZnO is more preferably in the range of 0.5 to 20%, still more preferably in the range of 1 to 18%, yet more preferably in the range of 2 to 17%, further more preferably in the range of 3 to 17%, still further more preferably in the range of 4 to 17%.

$La_2O_3$ is essential for realizing the high-refractivity low-dispersion properties, and it also works to improve the chemical durability. When the content thereof is less than 5%, it is difficult to obtain the desired refractive index. When it exceeds 50%, the liquidus temperature is increased, and the devitrification resistance is degraded. Therefore, the content of $La_2O_3$ is adjusted to 5 to 50%. The content of $La_2O_3$ is preferably in the range of 5 to 45%, more preferably in the range of 5 to 40%, still more preferably in the range of 5 to 35%, yet more preferably in the range of 7 to 30%, further more preferably in the range of 10 to 25%.

When made to be co-present with $La_2O_3$, $Gd_2O_3$ works to decrease the liquidus temperature and greatly improve the devitrification resistance. When the content thereof is less than 0.1%, the refractive index decreases, the liquidus temperature increases and the devitrification resistance and the chemical resistance are degraded. On the other hand, when it exceeds 25%, the liquidus temperature is increased, and the devitrification resistance is degraded. Therefore, the content of $Gd_2O_3$ is adjusted to 0.1 to 25%. The content of $Gd_2O_3$ is preferably in the range of 0.1 to 20%, more preferably in the range of 0.1 to 18%, still more preferably in the range of 0.1 to 15%, yet more preferably in the range of 0.1 to 12%, further more preferably in the range of 0.1 to 10%, still further more preferably in the range of 1 to 10%.

When made to be co-present with $La_2O_3$, $Y_2O_3$ also works to decrease the liquidus temperature and greatly improve the devitrification resistance. When the content thereof is less than 0.1%, the refractive index decreases, the liquidus temperature increases, and the devitrification resistance and the chemical durability are degraded. On the other hand, when it exceeds 20%, the liquidus temperature is increased, and the devitrification resistance is degraded. Therefore, the content of $Y_2O_3$ is adjusted to 0.1 to 20%. The content of $Y_2O_3$ is preferably in the range of 0.1 to 18%, more preferably in the range of 0.1 to 15%, still more preferably in the range of 0.1 to 13%, yet more preferably in the range of 0.1 to 10%, further more preferably in the range of 0.1 to 7%, still further more preferably in the range of 5 to 7%.

When made to be co-present with $La_2O_3$, $Yb_2O_3$ also works to decrease the liquidus temperature and greatly improve the devitrification resistance. When the content thereof exceeds 20%, the liquidus temperature is increased, and the devitrification resistance is degraded. Therefore, the content of $Yb_2O_3$ is adjusted to 0 to 20%. The content of $Yb_2O_3$ is preferably in the range of 0 to 18%, more preferably in the range of 0 to 16%, still more preferably in the range of 0 to 14%, yet more preferably in the range of 0 to 12%, further more preferably in the range of 0 to 10%, still further more preferably in the range of 0 to 5%.

$ZrO_2$ works to increase the refractive index and improve the chemical durability. Even when introduced in a small amount, it produces an excellent effect. However, when the content thereof exceeds 25%, the glass transition temperature and the liquidus temperature increase, and the devitrification resistance decreases. Therefore, the content of $ZrO_2$ is adjusted to 0 to 25%. The content of $ZrO_2$ is preferably in the range of 0 to 22%, more preferably in the range of 2 to 22%, still more preferably in the range of 2 to 20%, yet more preferably in the range of 2 to 18%, further more preferably in the range of 2 to 15%, still further more preferably in the range of 2 to 13%.

$TiO_2$ works to increase the refractive index and improve the chemical durability and the devitrification resistance. When the content thereof exceeds 25%, however, it is difficult to obtain the desired Abbe's number, and moreover, the glass transition temperature and the liquidus temperature are increased, and the devitrification resistance is degraded. Therefore, the content of $TiO_2$ is adjusted to 0 to 25%. The content of $TiO_2$ is preferably in the range of 0 to 22%, more preferably in the range of 3 to 20%, still more preferably in the range of 3 to 18%, yet more preferably in the range of 3 to 17%, further more preferably in the range of 3 to 16%.

$Nb_2O_5$ increases the refractive index and also works to decrease the liquidus temperature and improve the devitrification resistance. When the content thereof exceeds 20%, the liquidus temperature is increased, the devitrification resistance is degraded, and it is difficult to realize the desired Abbe's number. Further, the glass is more intensely colored. Therefore, the content of $Nb_2O_5$ is adjusted to 0 to 20%. The content of $Nb_2O_5$ is preferably in the range of 0 to 18%, more preferably in the range of 0 to 15%, still more preferably in the range of 0 to 12%, yet more preferably in the range of 0 to 10%, further more preferably in the range of 0 to 8%.

$Ta_2O_5$ works not only to realize the high-refractivity low-dispersion properties and also to improve the glass stability. Since, however, it is an expensive component, the content thereof is limited to 10% or less for achieving the stably supply of a high-refractivity low-dispersion glass that is an object of this invention. Further, when the content thereof exceeds 10%, the liquidus temperature is increased, and the devitrification resistance is degraded. Therefore, the content of $Ta_2O_5$ is adjusted to 0 to 10%. The content of $Ta_2O_5$ is preferably in the range of 0 to 7%, more preferably in the range of 0 to 5%, still more preferably in the range of 0 to 4%, yet more preferably in the range of 0 to 3%, further more preferably in the range of 0 to 2%, still further more preferably in the range of 0 to 1%. It is particularly preferred to incorporate no $Ta_2O_5$.

$WO_3$ is an essential component that increases the refractive index, that decreases the liquidus temperature and that serves to improve the devitrification resistance. When the content thereof is 0.1% or less, it is difficult to obtain the desired refractive index, and further, the liquidus temperature increases, and the devitrification resistance is degraded. On the other hand, when the content thereof exceeds 20%, the liquidus temperature is increased, and the devitrification resistance is degraded. Further, the glass is more intensely colored. Therefore, the content of $WO_3$ is adjusted to over 0.1% but not more than 20%. The content of $WO_3$ is preferably in the range of 0.1 to 18%, more preferably in the range of 0.1 to 15%, still more preferably in the range of 0.5 to 10%, yet more preferably in the range of 0.5 to 8%, further more preferably in the range of 0.5 to 7%.

$GeO_2$ is a network-forming oxide and works to increase the refractive index, so that it is a component that increases the refractive index while maintaining the glass stability. Since, however, it is a very expensive component, it is desirable to decrease its amount together with the Ta component amount. In this invention, the composition is determined as already described, so that even if the content of $GeO_2$ is decreased to less than 3%, the desired optical properties and excellent glass stability can be together brought to realization. Therefore, the content of $GeO_2$ is adjusted to 0 to less than 3%. The content of $GeO_2$ is preferably in the range of 0 to 2%, more preferably in the range of 0 to 1%, still more preferably in the range of 0 to 0.5%. Containing no $GeO_2$ or being a Ge-free glass is particularly preferred.

$Bi_2O_3$ works not only to increase the refractive index but also to improve the glass stability. However, when the content thereof exceeds 10%, the light transmittance in a visible light region is decreased. Therefore, the content of $Bi_2O_3$ is adjusted to 0 to 10%. The content of $Bi_2O_3$ is preferably in the range of 0 to 5%, more preferably in the range of 0 to 2%, still more preferably in the range of 0 to 1%. It is particularly preferred to incorporate no $Bi_2O_3$.

When introduced in a small amount, $Al_2O_3$ works to improve the glass stability and the chemical durability. However, when the content thereof exceeds 10%, the liquidus temperature is increased, and the devitrification resistance is degraded. Therefore, the content of $Al_2O_3$ is adjusted to 0 to 10%. The content of $Al_2O_3$ is preferably in the range of 0 to 5%, more preferably in the range of 0 to 2%, still more preferably in the range of 0 to 1%. It is preferred to incorporate no $Al_2O_3$.

$Sb_2O_3$ can be added as a refiner, and when added in a small amount, it works to inhibit a decrease in light transmittance which is caused by the inclusion of impurities such as Fe. However, when it is added in an amount of over 1 mass % based on the glass composition excluding $Sb_2O_3$, the glass is colored, or it aggravates the deterioration of molding surface of a press mold during press-molding due to its strong oxidizing action. Therefore, the amount of $Sb_2O_3$ to be added on the basis of the glass composition excluding $Sb_2O_3$ is preferably 0 to 1 mass %, more preferably 0 to 0.5 mass %.

$SnO_2$ can be also added as a refiner. However, when it is added in an amount of over 1 mass % based on the glass composition excluding $SnO_2$, the glass is colored, or it aggravates the deterioration of molding surface of a press mold during press-molding due to its oxidizing action. Therefore, the amount of $SnO_2$ to be added on the basis of the glass composition excluding $SnO_2$ is preferably 0 to 1 mass %, more preferably 0 to 0.5 mass %.

The optical glass of this invention realizes the optical properties of high-refractivity low-dispersion while maintaining the glass stability, and it hence obviates the incorporation of components such as Lu and Hf. Since Lu and Hf are expensive components, it is preferred to limit the content of each of $Lu_2O_3$ and $HfO_2$ to 0 to 1%, and it is more preferred to limit the content of each to 0 to 0.5%. Introducing none of $Lu_2O_3$ and $HfO_2$ is particularly preferred.

It is also preferred to introduce none of As, Pb, U, Th, Te and Cd by taking account of adversary effects on the environment.

For making the best use of the excellent light transmittance of the glass, it is preferred to introduce none of substances that cause the glass to be colored, such as Cu, Cr, V, Fe, Ni, Co, etc.
(Properties of Optical Glass)

The refractive index nd of the optical glass of this invention is 1.86 to 1.95. The lower limit of the refractive index nd is preferably 1.87, more preferably 1.88, still more preferably 1.89, and the upper limit thereof is preferably 1.94, more preferably 1.93, still more preferably 1.92.

A glass having a small Abbe's number vd, i.e., a glass having high dispersion makes it easier to increase the refractive index while maintaining the stability. In this invention, therefore, the lower limit of the Abbe's number vd is defined relative to the refractive index nd. The Abbe's number vd of the optical glass of this invention is (2/36−nd)/0.014 or more but less than 38. The lower limit of the Abbe's number vd is preferably (2.356−nd)/0.0137, more preferably (2.356−nd)/0.0187.

The optical glass of this invention is a glass suitable for forming a flat and smooth optical-function surface by cutting and polishing. The suitability of cold processings such as cutting, polishing, etc., i.e., cold processability is related to the glass transition temperature although it is indirect. A glass having a low glass transition temperature is more suitable to precision press-molding than to cold processing, whereas a glass having a high glass transition temperature is more suitable to cold processing than to precision press-molding, and it has excellent cold processability. In this invention, therefore, when cold processability comes before anything else, it is preferred not to decrease the glass transition temperature to excess. The glass transition temperature is preferably adjusted to 630° C. or higher, more preferably adjusted to 640° C. or higher, and still more preferably adjusted to 660° C. or higher. However, when the glass transition temperature is too high, the heating temperature is high when the glass is re-heated to soften it, a mold used for molding is intensely deteriorated, the annealing temperature is high, and the annealing furnace is intensely deteriorated or worn out. Therefore, the glass transition temperature is preferably adjusted to 720° C. or lower, more preferably adjusted to 710° C. or lower, still more preferably adjusted to less than 700° C.
(Process for Producing Optical Glass)

The process for the production of an optical glass, provided by this invention, will be explained below. For example, powdered compound raw materials or cullet raw materials are weighed and formulated so as to correspond to an intended glass composition, and the formulated raw materials are supplied into a melting vessel and then melted by heating. The above raw materials are completely melted to form a glass, and then, this molten glass is temperature-increased to refine it. The refined molten glass is homogenized by stirring it with a stirrer, and the refined glass is continuously supplied into a glass flow pipe and caused to flow out, followed by rapid cooling and solidification, to obtain a glass shaped material.

The press-molding glass gob of this invention will be explained below.
[Press-molding Glass Gob]

The press-molding glass gob of this invention is characteristically formed of the above optical glass of this invention. The gob is shaped into an easily press-moldable form depending upon the form of an intended press-molded product. Further, the mass of the gob is determined so as to be suited to a press-molded product. In this invention, the glass used has excellent stability, so that the glass does not easily devitrify even when it is press-molded by re-heating and softening, and shaped products of high quality can be stably produced.

Examples of production of the press-molding glass gob are as follows.

In a first production example, a molten glass flowing out of a pipe is continuously cast into a mold that is horizontally placed below the flow pipe, and it is shaped in the form of a plate having a constant thickness. The shaped glass is continuously withdrawn in the horizontal direction from an opening portion provided on a side surface of the mold. The withdrawal of the shaped material in the form of a plate is carried out by means of a belt conveyor. The withdrawal speed of the belt conveyor is set at a constant speed, and the glass shaped material is withdrawn such that it has a constant thickness, whereby a glass shaped material having a predetermined thickness and a predetermined width can be obtained. The glass shaped material is carried to an annealing furnace by means of a belt conveyor and gradually cooled. The gradually cooled glass shaped material is cut or split in the plate thickness direction, and each cut piece is polished or barrel-polished to form press-molding glass gobs.

In a second production example, a molten glass is cast into a cylindrical mold in place of the above mold, to shape a columnar glass shaped material. The glass shaped material obtained in the mold is withdrawn vertically downward from an opening portion of bottom of the mold at a constant speed. The withdrawal speed can be determined such that the liquid level of the molten glass in the mold is constant. The glass shaped material is gradually cooled and then, it is cut or split, and each cut piece is polished or barrel-polished to form press-molding glass gobs.

In a third production example, a shaping machine having a plurality of shaping molds arranged on a circular turn table at equal intervals is placed below the flow pipe, the turn table is index-turned, one of stop positions of the shaping molds is employed as a position where molten glass is supplied to shaping mold (to be referred to as "casting position"), molten glass is supplied to shaping mold on the casting position, the supplied molten glass is shaped into a glass shaped material, and then the glass shaped material is taken out at a predetermined shaping mold stop position (take-out position) different from the casting position. Which stop position is to be employed as the take-out position can be determined by taking account of the turn speed of the turn table, the cooling speed of the glass, etc. The supply of molten glass to the shaping mold in the casting position can be carried out by a method in which molten glass is dropped from the flow outlet of the flow pipe and the glass drop is received with the above shaping mold, a method in which the shaping mold staying in the casting position is brought near to the glass flow outlet to support the lower end portion of the molten glass flow, a narrow portion is formed in the middle of the glass flow, the shaping mold is rapidly moved vertically downward timely as is predetermined thereby to separate molten glass lower than the narrow portion and the separated molten glass is received on the shaping mold, or a method in which the molten glass flow that is flowing out is cut with a cutting blade and the thus-separated molten glass gob is received with the shaping mold staying in the casting position.

For shaping a glass on the shaping mold, a known method can be used. In particular, when a glass is shaped while the glass is floated by ejecting a gas upward from the shaping mold and applying a gas pressure to a glass gob upwardly, the formation of creases on the glass shaped material surface and the cracking of the glass shaped material by contact to the shaping mold can be prevented.

The form of the glass shaped material may be a form of a sphere, a form of a spheroid, a form having one axis of rotational symmetry and having two planes facing the axis of rotational symmetry and being convex outwardly, etc. These forms are suitable for glass gobs that are press-molded to produce optical elements such as a lens, etc., or optical element blanks. The thus-obtained glass shaped material can be used as a press-molding glass gob as it is, or its surface is polished or barrel-polished to give a press-molding glass gob.

[Optical Element]

The optical element of this invention will be explained below.

The optical element of this invention is characteristically formed of the above optical glass of this invention. The optical element of this invention has high-refractivity low-dispersion properties, and expensive components such as $Ta_2O_5$, $GeO_2$, etc., are controlled such that their contents are very small or zero, so that optical elements such as optically valuable various lenses, prisms, etc., can be provided at a low cost.

Examples of the lenses include various lenses whose lens surface each is spherical or aspherical such as a concave meniscus lens, a convex meniscus lens, a biconvex lens, a biconcave lens, a plano-convex lens, a plano-concave lens, etc.

These lenses are suitable as lenses for correcting chromatic aberration since they can correct chromatic aberration when combined with a lens formed of a high-refractivity high-dispersion glass. Further, they are lenses effective for downsizing an optical system.

Further, the prisms have a high refractive index, and therefore, when they are incorporated into an image-sensing optical system to bend a light path toward a desired direction, there can be realized a compact optical system of wide angle of view.

The optical-function surface of the optical element of this invention may be provided with a film that controls a light transmittance, such as an anti-reflection film, etc.

[Process for Producing an Optical Element Blank]

The process for the production of an optical element blank, provided by this invention, will be explained below.

The process for the production of an optical element blank, provided by this invention, includes the following two embodiments.

(First Process for Producing an Optical Element Blank)

The first process for the production of an optical element blank, provided by this invention, is a process for the production of an optical element blank that is to be cut and polished to complete an optical element, in which the above press-molding glass gob of this invention is softened under heat and press-molded.

The optical element blank is a glass shaped material having a form that is obtained by adding a working margin to be removed by cutting and grinding to the form of an intended optical element and that is similar to the form of an optical element.

For producing the optical element blank, there is provided a press mold having a molding surface having a reversed form of the form of said blank. The press mold is constituted of mold parts including an upper mold member, a lower mold member and optionally a sleeve member, and the mold surfaces of the upper and lower mold members are formed in the above form, or when the sleeve member is used, the molding surface of the sleeve member is formed in the above form.

Then, a mold release agent in the form of a powder, such as boron nitride, or the like is uniformly applied to the press-molding glass gob, the glass gob is softened under heat and then introduced onto the lower mold member, and the softened glass gob is pressed with the upper mold member facing the lower mold member to shape an optical element blank.

Then, the optical element blank is released from the press mold, taken out of the press mold and then annealed. By this annealing treatment, a strain inside the glass is decreased to bring optical properties such as a refractive index, etc., into desired values.

The condition for heating the glass gob, the press-molding condition and the material used for the press mold can be selected from known conditions and materials. The above steps can be carried out in atmosphere.

(Second Process for Producing an Optical Element Blank)

The second process for the production of an optical element blank, provided by this invention, is a process for the production of an optical element blank that is to be cut and polished to complete an optical element, in which glass raw materials are melted and the resultant molten glass is press-molded to produce an optical element blank formed of the above optical glass of this invention.

A press mold is constituted of mold parts including an upper mold member, a lower mold member and optionally a sleeve member. The molding surface of the press mold is processed in the reversed form of the surface form of an optical element blank as described above.

A mold release agent in the form of a powder such as boron nitride, or the like is uniformly applied onto the molding surface of the lower mold member, a molten glass obtained by melting according to the above process for the production of an optical glass is caused to flow out onto the molding surface of the lower mold member, and when the amount of molten glass on the lower mold member reaches a desired amount, the molten glass flow is cut off with cutting blade(s) called shears. After the molten glass gob is obtained on the lower mold member, the lower mold member with the molten glass gob is moved to a position where the upper mold member stands by above, and the glass is pressed with the upper mold member and the lower mold member, to shape an optical element blank.

Then, the optical element blank is released from the press mold, taken out of the press mold and annealed. By this annealing treatment, a strain inside the glass is decreased to bring optical properties such as a refractive index, etc., into desired values.

The condition for heating the glass gob, the press-molding condition and the material used for the press mold can be selected from known conditions and materials. The above steps can be carried out in atmosphere.

The process for the production of an optical element, provided by this invention, will be explained below.

[Process for Producing an Optical Element]

The process for the production of an optical element, provided by this invention, comprises cutting and polishing the optical element blank produced by each of the above processes of this invention. The cutting and polishing can be carried out by applying known methods.

EXAMPLES

This invention will be explained with reference to Examples hereinafter, while this invention shall not be limited by these Examples.

Example 1

Carbonates, nitrates, hydroxides, oxides, boric acid, etc., were used as raw materials, and powders of the raw materials were weighed and fully mixed to obtain formulated raw materials for obtaining glasses Nos. 1 to 10 having compositions shown in Table 1. The formulated raw materials were placed in platinum crucibles and heated at 1,400° C. to melt them, and the molten glasses were refined and stirred to obtain homogeneous molten glasses. These molten glasses were cast into pre-heated molds and rapidly cooled, and they were maintained at temperatures around their glass transition temperatures for 2 hours and then gradually cooled to give optical glasses named glass Nos. 1 to 10. No crystal precipitation was found in any of the glasses.

The glasses were measured for properties by methods shown below. Table 2 shows the measurement results.

(1) Refractive Index nd and Abbe's Number vd

An optical glass obtained by gradual cooling at a rate of 30° C/hour was measured.

(2) Glass Transition Temperature Tg

Measured with a thermomechanical analyzer under the conditions of a temperature elevation rate of 4° C./minute.

(3) Liquidus Temperature LT

A glass was placed in a furnace heated to a predetermined temperature and held there for 2 hours. After the glass was cooled, an inside of the glass was observed through an optical microscope with a magnification of 100 times, and a liquidus temperature was determined on the basis of whether or not a crystal existed.

(4) Viscosity at Liquidus Temperature

A viscosity was measured by a viscosity measurement method using a coaxial double cylinder type rotational viscometer according to Viscosity JIS Standard Z8803.

(5) Specific Gravity

Measured by an Archimedean method.

TABLE 1

| | | Glass No. | | | | | | | | | |
|---|---|---|---|---|---|---|---|---|---|---|---|
| | | 1 | 2 | 3 | 4 | 5 | 6 | 7 | 8 | 9 | 10 |
| $SiO_2$ | Mol % | 17.0 | 16.8 | 16.6 | 19.3 | 20.8 | 20.8 | 20.9 | 20.8 | 20.5 | 20.5 |
| | Mass % | 6.9 | 6.9 | 6.9 | 8.1 | 8.8 | 8.7 | 8.8 | 8.7 | 8.9 | 9.0 |
| $B_2O_3$ | Mol % | 25.8 | 25.5 | 23.8 | 21.9 | 21.8 | 21.8 | 21.9 | 21.9 | 21.5 | 21.4 |
| | Mass % | 12.1 | 12.0 | 11.5 | 10.7 | 10.7 | 10.6 | 10.6 | 10.6 | 10.9 | 10.7 |
| ZnO | Mol % | 10.0 | 10.0 | 14.3 | 12.6 | 9.7 | 9.7 | 9.7 | 9.7 | 11.0 | 11.0 |
| | Mass % | 5.5 | 5.5 | 8.1 | 7.2 | 5.5 | 5.5 | 5.5 | 5.5 | 6.5 | 6.5 |
| $La_2O_3$ | Mol % | 19.3 | 19.1 | 18.8 | 18.6 | 18.6 | 19.3 | 18.6 | 18.6 | 16.8 | 18.3 |
| | Mass % | 42.3 | 42.3 | 42.5 | 42.3 | 42.4 | 44.0 | 42.4 | 42.2 | 39.7 | 43.3 |
| $Gd_2O_3$ | Mol % | 4.2 | 4.2 | 4.1 | 4.1 | 4.1 | 4.1 | 4.1 | 4.1 | 4.0 | 2.6 |
| | Mass % | 10.4 | 10.4 | 10.4 | 10.4 | 10.4 | 10.3 | 10.4 | 10.3 | 10.6 | 6.8 |
| $Y_2O_3$ | Mol % | 2.3 | 2.3 | 2.3 | 2.2 | 2.2 | 1.5 | 2.2 | 2.2 | 2.2 | 2.2 |
| | Mass % | 3.5 | 3.5 | 3.5 | 3.5 | 3.5 | 2.3 | 3.5 | 3.5 | 3.6 | 3.6 |
| $ZrO_2$ | Mol % | 7.3 | 7.2 | 7.1 | 7.0 | 7.0 | 7.0 | 6.3 | 6.2 | 6.9 | 6.9 |
| | Mass % | 6.0 | 6.0 | 6.1 | 6.0 | 6.0 | 6.0 | 5.4 | 5.4 | 6.1 | 6.2 |
| $TiO_2$ | Mol % | 10.0 | 10.0 | 9.8 | 11.1 | 12.6 | 12.6 | 12.7 | 12.6 | 13.9 | 13.9 |
| | Mass % | 5.4 | 5.4 | 5.4 | 6.2 | 7.1 | 7.0 | 7.1 | 7.0 | 8.0 | 8.1 |
| $Nb_2O_5$ | Mol % | 1.8 | 1.8 | 1.7 | 1.7 | 1.7 | 1.7 | 2.1 | 1.7 | 1.7 | 1.7 |
| | Mass % | 3.2 | 3.2 | 3.2 | 3.2 | 3.2 | 3.2 | 3.9 | 3.2 | 3.2 | 3.3 |
| $Ta_2O_5$ | Mol % | 0.8 | 0.0 | 0.0 | 0.0 | 0.0 | 0.0 | 0.0 | 0.0 | 0.0 | 0.0 |
| | Mass % | 2.3 | 0.0 | 0.0 | 0.0 | 0.0 | 0.0 | 0.0 | 0.0 | 0.0 | 0.0 |

TABLE 1-continued

|  |  | Glass No. | | | | | | | | | |
|---|---|---|---|---|---|---|---|---|---|---|---|
|  |  | 1 | 2 | 3 | 4 | 5 | 6 | 7 | 8 | 9 | 10 |
| WO3 | Mol % | 1.5 | 3.1 | 1.5 | 1.5 | 1.5 | 1.5 | 1.5 | 2.2 | 1.5 | 1.5 |
|  | Mass % | 2.4 | 4.8 | 2.4 | 2.4 | 2.4 | 2.4 | 2.4 | 3.6 | 2.5 | 2.5 |
| Total | Mol % | 100.0 | 100.0 | 100.0 | 100.0 | 100.0 | 100.0 | 100.0 | 100.0 | 100.0 | 100.0 |
|  | Mass % | 100.0 | 100.0 | 100.0 | 100.0 | 100.1 | 100.1 | 100.1 | 100.1 | 100.1 | 100.1 |
| Sb2O3 | Mol % | — | — | — | — | — | — | — | — | — | — |
|  | Mass % | 0 | 0 | 0 | 0 | 0.1 | 0.1 | 0.1 | 0.1 | 0.1 | 0.1 |
| SiO2/B2O3 | Mol % | — | — | — | — | — | — | — | — | — | — |
|  | Mass % | 0.57 | 0.58 | 0.6 | 0.76 | 0.82 | 0.82 | 0.83 | 0.82 | 0.82 | 0.84 |

(Note 1)
Amounts of $Sb_2O_3$ are based on glass composition excluding $Sb_2O_3$.
(Note 2)
$SiO_2/B_2O_3$ means a value obtained by dividing content of $SiO_2$ by mol % with content of $B_2O_3$ by mol %.
(Note 3)
Total (mass %) means a value obtained by adding amount of $Sb_2O_3$.

TABLE 2

| Glass No. | nd | vd | (2.36 − nd)/ 0.014 | Tg (° C.) | Liquidus temperature (° C.) | Viscosity at liquidus temperature (dPa · s) | Specific gravity |
|---|---|---|---|---|---|---|---|
| 1 | 1.89879 | 36.27 | 32.94 | 681 | 1210 | 3 | 5.07 |
| 2 | 1.89919 | 35.9 | 32.92 | 677 | 1210 | 3 | 5.05 |
| 3 | 1.89985 | 36.31 | 32.87 | 675 | 1200 | — | 5.05 |
| 4 | 1.90218 | 35.73 | 32.70 | 680 | 1210 | — | 5.03 |
| 5 | 1.90315 | 35.24 | 32.63 | 688 | 1220 | 2.32 | 4.98 |
| 6 | 1.90524 | 35.18 | 32.48 | 688 | 1230 | — | 5.01 |
| 7 | 1.90472 | 34.97 | 32.52 | 685 | 1220 | — | 5.01 |
| 8 | 1.90561 | 34.86 | 32.46 | 688 | 1200 | — | 4.99 |
| 9 | 1.90446 | 34.4 | 32.54 | 683 | 1200 | — | 4.93 |
| 10 | 1.90496 | 34.42 | 32.50 | 679 | 1200 | — | 4.93 |

Comparative Example 1

Raw materials were prepared so as to obtain a composition that maintained content ratios of components other than $Ta_2O_5$ but had a $Ta_2O_5$ content of zero in the composition No. 37 in Table 8 of JP 2007-269584A. These raw materials were melted under heat and a melt was cast into a mold and rapidly cooled. As a result, the entire glass devitrified to turn opaque as shown in FIG. 1, left.

Comparative Example 2

Raw materials were prepared so as to obtain a composition that was the same as the composition No. 37 in Table 8 of JP 2007-269584A except that the entire content of $Ta_2O_5$ was replaced with $La_2O_3$, $Gd_2O_3$, $TiO_2$, $Nb_2O_5$, $WO_3$ and $ZrO_2$ in equal proportions which were other components for imparting a high refractive index. The raw materials were melted under heat and a melt was cast into a mold and rapidly cooled. As a result, the entire glass devitrified to turn opaque as shown in FIG. 1, right.

Example 2

Press-molding glass gobs formed of the optical glasses Nos. 1 to 10 in Example 1 were produced in the following manner.

First, glass raw materials were prepared so as to obtain the above glasses, and they were placed in platinum crucibles, melted under heat, refined and stirred to give homogeneous molten glasses. Each molten glass was caused to flow out of a flow pipe at a constant flow rate and cast into a mold that was horizontally arranged below the flow pipe to form glass plates having a constant thickness. Each of the thus-formed glass plates was continuously withdrawn in the horizontal direction through an opening portion provided on a side surface of the mold, carried into an annealing furnace with a belt conveyor and gradually cooled.

The gradually cooled glass plates were cut or split to make glass pieces and these glass pieces were barrel-polished to obtain press-molding glass gobs.

In addition, press-molding glass gobs can be also obtained by arranging a cylindrical mold below the flow pipe, casting the molten glass into the mold to shape columnar glass, withdrawing columnar glass vertically downward through an opening portion of the mold bottom at a constant speed, then gradually cooling the glass, cutting or splitting the glass to make glass pieces and barrel-polishing the glass pieces.

Example 3

A molten glass was caused to flow out of a flow pipe in the same manner as in Example 2, and a lower end of the molten glass that was flowing out was received with a shaping mold. Then, the shaping mold was rapidly moved downward to cut the molten glass flow on the basis of a surface tension, to obtain a molten glass mass having a predetermined weight on the shaping mold. And, gas was ejected from the shaping mold to apply a gas pressure upwardly to the glass, the glass was shaped into a glass mass while it was floated, and the glass mass was taken out of the shaping mold and annealed. The glass mass was barrel-polished. In this manner, press-molding glass gobs formed of the same glasses as those in Example 2 were obtained.

Example 4

A mold release agent that was a boron nitride powder was uniformly applied to the entire surface of each of the press-molding glass gobs obtained in Example 3, and the above glass gobs were softened under heat and press-molded to produce blanks of various lenses such as concave meniscus lenses, convex meniscus lenses, biconvex lenses, biconcave lenses, plano-convex lenses, plano-concave lenses, etc, and prisms, Example 5

Molten glasses were prepared in the same manner as in Example 2, and each molten glass was supplied onto the molding surface of a lower mold member to which a mold release agent that was a boron nitride powder had been applied. When the amount of each molten glass on the lower mold member reached a predetermined amount, the molten glass flow was cut with cutting blade(s).

Each of the thus-obtained molten glass gobs on the lower mold members was pressed with the upper mold member and the lower mold member, to produce blanks of various lenses such as concave meniscus lenses, convex meniscus lenses, biconvex lenses, biconcave lenses, plano-convex lenses, plano-concave lenses, etc., and prisms.

Example 6

The blanks obtained in Examples 4 and 5 were annealed. The annealing is carried out to decrease a strain inside each glass and bring optical properties such as a refractive index, etc., into desired values.

The blanks were ground and polished to produce various lenses such as concave meniscus lenses, convex meniscus lenses, biconvex lenses, biconcave lenses, plano-convex lenses, plano-concave lenses, etc., and prisms. An anti-reflection film may be coated on the surface of each of the thus-obtained optical elements.

Example 7

Glass plates and columnar glasses were prepared in the same manner as in Example 2, and the thus-obtained glass shaped materials were annealed to decrease a strain inside each glass and bring optical properties such as a refractive index, etc., into desired values.

Then, the glass shaped materials were cut, ground and polished to produce blanks of various lenses such as concave meniscus lenses, convex meniscus lenses, biconvex lenses, biconcave lenses, plano-convex lenses, plano-concave lenses, etc., and prisms. An anti-reflection film may be coated on the surface of each of the thus-obtained optical elements.

Industrial Utility

This invention is an optical glass that can be stably supplied and that has excellent glass stability and high-refractivity low-dispersion properties, and is suitable for press-molding glass gobs, optical element blanks and optical elements.

The invention claimed is:

1. An optical glass comprising, by mol %,
0.1 to 40% of $SiO_2$,
10 to 50% of $B_2O_3$,
0 to 10% of total of $Li_2O$, $Na_2O$ and $K_2O$,
0 to 10% of total of MgO, CaO, SrO and BaO,
0.5 to 22% of ZnO,
5 to 50% of $La_2O_3$,
0.1 to 25% of $Gd_2O_3$,
0.1 to 20% of $Y_2O_3$,
0 to 20% of $Yb_2O_3$,
0 to 25% of $ZrO_2$,
0 to 25% of $TiO_2$,
0 to 20% of $Nb_2O_5$,
0 to 7% of $Ta_2O_5$,
over 0.1% but not more than 20% of $WO_3$,
0 to less than 3% of $GeO_2$,
0 to 10% of $Bi_2O_3$, and
0 to 10% of $Al_2O_3$,
the mass ratio of the content of $SiO_2$ to the content of $B_2O_3$, $SiO_2/B_2O_3$, being 1 or less, the optical glass having a refractive index nd of 1.86 to 1.95, an Abbe's number vd of (2.36−nd)/0.014 or more but less than 38, and a glass transition temperature of equal to or greater than 640° C.

2. The optical glass of claim 1, which has a refractive index nd of 1.89 to 1.95, an Abbe's number vd of (2.36−nd)/0.014 or more but less than 38.

3. The optical glass of claim 1, wherein the content of ZnO is 0.5 to 18 mol %.

4. The optical glass of claim 1, which is a Ge-free glass.

5. The optical glass of claim 1, wherein the content of $SiO_2$ is 3 to 35 mol %, and the content of $B_2O_3$ is 12 to 45 mol %.

6. The optical glass of claim 1, wherein the mass ratio of the content of $SiO_2$ to the content of $B_2O_3$, $SiO_2/B_2O_3$, being 0.95 or less.

7. The optical glass of claim 1, wherein the total content of $Li_2O$, $Na_2O$ and $K_2O$ is 0 to 8 mol %.

8. The optical glass of claim 1, wherein the total content of MgO, CaO, SrO and BaO is 0 to 8 mol %.

9. The optical glass of claim 1, comprising, by mol %,
5 to 45% of $La_2O_3$,
0.1 to 20% of $Gd_2O_3$,
0.1 to 18% of $Y_2O_3$, and
0 to 18% of $Yb_2O_3$.

10. The optical glass of claim 1, wherein the content of $ZrO_2$ is 0 to 22 mol %.

11. The optical glass of claim 1, wherein the content of $TiO_2$ is 0 to 22 mol %.

12. The optical glass of claim 1, wherein the content of $Nb_2O_5$ is 0 to 18 mol %.

13. The optical glass of claim 1, wherein the content of $Ta_2O_5$ is 0 to 5 mol %.

14. The optical glass of claim 1, wherein the content of $WO_3$ is greater than 0.1 mol % but equal to or less than 18 mol %.

15. The optical glass of claim 1, wherein the content of $Bi_2O_3$ is 0 to 5 mol %.

16. The optical glass of claim 1, wherein the content of $Al_2O_3$ is 0 to 5 mol %.

17. The optical glass of claim 1, wherein the content of $Sb_2O_3$ is 0 to 1 mass % based on the glass composition excluding $Sb_2O_3$.

18. The optical glass of claim 1, which has a glass transition temperature of equal to or greater than 660° C.

19. The optical glass of claim 1, which has a glass transition temperature of equal to or less than 720° C.

20. The optical glass of claim 1, which has a specific gravity of 4.93 to 5.07.

21. The optical glass according to claim 1, wherein the content of ranges from 0 to 1 mass % based on the glass composition excluding.

* * * * *